US006766510B2

(12) United States Patent
Takeda

(10) Patent No.: US 6,766,510 B2
(45) Date of Patent: Jul. 20, 2004

(54) APPLICATION PROGRAM DEVELOPING SYSTEM, APPLICATION PROGRAM DEVELOPING METHOD, AND RECORDING MEDIUM IN WHICH APPLICATION PROGRAM DEVELOPING PROGRAM IS STORED

(75) Inventor: Kazuyoshi Takeda, Suwa (JP)

(73) Assignee: Seiko Epson Corporation (JP)

( * ) Notice: Subject to any disclaimer, the term of this patent is extended or adjusted under 35 U.S.C. 154(b) by 341 days.

(21) Appl. No.: 09/881,194

(22) Filed: Jun. 14, 2001

(65) Prior Publication Data

US 2002/0032902 A1 Mar. 14, 2002

(30) Foreign Application Priority Data

Jun. 14, 2000 (JP) ........................................ 2000-178343

(51) Int. Cl.[7] ................................................. G06F 9/44
(52) U.S. Cl. ........................................................ 717/127
(58) Field of Search ............................... 717/127–135; 703/13.22

(56) References Cited

U.S. PATENT DOCUMENTS

| 6,167,352 A | * | 12/2000 | Kanevsky et al. | ............. 702/81 |
| 6,389,383 B1 | * | 5/2002 | Sarathy et al. | ................ 703/21 |
| 6,427,233 B1 | * | 7/2002 | Lee et al. | .................... 717/125 |
| 6,560,572 B1 | * | 5/2003 | Balaram et al. | .............. 703/22 |
| 6,587,995 B1 | * | 7/2003 | Duboc et al. | .................. 716/4 |

FOREIGN PATENT DOCUMENTS

| JP | 1-244547 | 9/1989 |
| JP | 6-149526 | 5/1994 |
| JP | 7-84765 | 3/1995 |
| JP | 9-244837 | 9/1997 |

OTHER PUBLICATIONS

Yu et al. Rapid Prototyping for Simulation Debugging Environment: An Enhanced Developing Method for Embedded Computer Software. IEEE. 1995. pp. 2663–2666.*
Allara et al. A Flexible Model for Evaluating the Behavior of Hardware/Software Systems. IEEE. 1997. pp. 109–114.*
Kadrovach et al. Hardware Simulation With Software Modeling for Enhanced Architecture Performance Analysis. IEEE. 1998. pp. 454–461.*
McKay et al. Software Engineering Applied to Discrete Event Simulations. Proceedings of the 1986 Winter Simulation Conference.*
International Search Report, Application No. PCT/JP01/05088, dated Sep. 18, 2001.

* cited by examiner

Primary Examiner—Wei Zhen
(74) Attorney, Agent, or Firm—Harness, Dickey & Pierce, P.L.C.

(57) ABSTRACT

There are provided an application program developing system and an application program developing method in which, in a case where a plurality of developing tools are formed in the same computer, even when any developing tool is active, the input states to the other developing tools can be held. Also provided is a storage medium in which an application program developing program is stored.

6 Claims, 4 Drawing Sheets

APPLICATION PROGRAM DEVELOPING SYSTEM, APPLICATION PROGRAM DEVELOPING METHOD, AND RECORDING MEDIUM IN WHICH APPLICATION PROGRAM DEVELOPING PROGRAM IS STORED

TECHNICAL FIELD

The present invention relates to an application program developing system and an application program developing method for developing an application program that includes at least a plurality of developing tools such as a debugger, a simulator, etc., on one computer such as a personal computer or the like, and operates on a target system such as a microcomputer or the like, and to a storage medium in which the application program developing program is stored.

BACKGROUND ART

Recently, microcomputers have been installed and widely used in various devices such as household electrical appliances, etc. In order to operate in accordance with the specifications of the device in which the microcomputer is installed, such as peripheral devices, etc., the microcomputer has an application program written in a built-in ROM (Read Only Memory). The microcomputer carries out various outputs on the basis of the application program in accordance with an input state input from input means of the device in which it is installed. Various types of input means exist depending on the installed target devices, for example, a key input, a voice input, a character input, etc. exist.

Therefore, in order to develop microcomputers, not only the development of hardware, but also the development of application programs is important. A development system for developing an application program is formed by a debugger, a simulator, etc., as developing tools.

The debugger executes the application program at every step, and can perform a break, a trace, etc. Further, the debugger connects to the simulator to start/stop the simulator, refer to and rewrite data on the simulator, etc. In the meantime, the simulator simulates the respective functions of components such as a CPU (Central Processing Unit), ROM, etc., of a target microcomputer and simulates also the input/output to/from the microcomputer and peripheral devices. When an application program is input by a disc device or the like of a computer, the simulator simulates the operation based on the application program under an environment that is equivalent to the environment in which they operate on the target microcomputer In general, the developing system is usually formed of the debugger, the simulator, etc., in the same computer, such as a personal computer. In this case, the debugger and the simulator commonly use a keyboard and a display of the personal computer as input means and output means. When the input means of an installed target device of the microcomputer is a key input type, each key of the installed target device is allocated to each key of the keyboard of the personal computer.

When the OS (Operating System) of the personal computer has a multi-window environment, input can be made in a window which is made active by the user. In this case, when the window of the simulator is active, the simulator carries out the simulation with a key input from the keyboard of the personal computer as a key input from the installed target device. Input to the debugger becomes possible when the window of the debugger is active.

With respect to the debugging of the application program, the debugging must be carried out on the assumption of various states of the microcomputer-installed target device in order to enhance the simulation accuracy of the application program. For example, there is a case wherein an application program is required to be executed step by step by the debugger while the [A] key or the like is pressed as an input to the simulator (that is, in the state in which the [A] key of the installed target device is pressed). However, when the debugger and the simulator are formed in the same personal computer, the input from the keyboard of the personal computer is regarded as the input to the debugger if step-by-step execution is carried out by the debugger. Accordingly, it is impossible for the debugger to carry out step-by-step execution while holding the key input state to the simulator. For example, if the command window of the debugger is set to be active, the input from the keyboard of the personal computer becomes the input to the command window. Therefore, it is impossible to carry out key input to the simulator by using the keyboard of the personal computer. That is, since the window for key input of the simulator is not active while the window of the debugger is active, the key input state to the simulator cannot be held. As a result, the number of items to be debugged in the application program is reduced, and thus the simulation accuracy of the application program is lowered.

Therefore, the object of the present invention is to provide an application program developing system and an application program developing method such that even when a certain developing tool is active, input states to other developing tools can be held in the case where a plurality of developing tools are formed in the same computer, and a storage medium in which an application program developing program is stored.

SUMMARY OF THE INVENTION

To achieve these objects, the present invention provides an application program developing system such that the system has a plurality of developing tools including at least first and second developing tools which are installed in a computer, the developing tools commonly use input means of the computer as input means for these developing tools, the developing system develops application programs that work on the target system, and is characterized in that the first developing tool has accepting means for accepting an input to the second developing tool, and the second developing tool has holding means for holding an input state accepted by the accepting means while the first developing tool is active.

According to the application program developing system, the input to hold as the input state of the second developing tool is accepted by the accepting means, and the input state can be held by the holding means in the second developing tool even when the first developing tool is active. Therefore, the application program can be developed under various states, and thus the quality of the application programs can be enhanced.

Further, in the above application program developing system, the first developing tool is a debugging device and the second developing tool is a simulation device, wherein the simulation device simulates the operation based on the application program by holding the input state while the debugging device debugs the application program.

According to the application program developing system, the input state to the simulation device can be held even while the debugging device carries out debugging.

Therefore, the number of items to be debugged in the application program is increased, and thus the simulation accuracy of the application program can be enhanced.

To achieve these objects, the present invention provides an application program developing method of a program that has a plurality of developing tools including at least first and second developing tools which are installed in a computer, the developing tools commonly use input means of the computer as input means for these developing tools, the developing system develops application programs that work on the target system, and is characterized by comprising the steps of: the first developing tool accepting an input to the second developing tool, and the second developing tool holding an input state accepted in the accepting step while the first developing tool is active.

According to the application program developing method, the input to hold as the input state of the second developing tool can be accepted in the accepting step, and the input state can be held in the holding step in the second developing tool even when the first developing tool is active. Therefore, the application program can be developed under various states, and the quality of the application program can be enhanced.

Further, in the above application program developing method, the first developing tool is a debugging device and the second developing tool is a simulation device, wherein the simulation device simulates the operation based on the application program by holding the input state while the debugging device debugs the application program.

According to the above application program developing method, the input state to the simulation device can be held even when the debugging is carried out by the debugging device. Therefore, the number of items to be debugged in the application program is increased, and the simulation accuracy of the application program is enhanced.

To achieve these objects, the present invention provides a storage medium with an application program developing program such that the program has a plurality of developing tools including at least first and second developing tools which are installed in a computer, the developing tools commonly use input means of the computer as input means for these developing tools, the developing system develops application programs that work on the target system, and is characterized in that the first developing tool accepts an input to the second developing tool, and the second developing tool holds the input state accepted by the first developing tool while the first developing tool is active.

According to the storage medium on which the application program developing program is stored, the input to hold the input state of the second developing tool is accepted in the first developing tool by operating the application program developing program on the computer, and the input state can be held in the second developing tool even when the first developing tool is active. Therefore, the application program can be developed under various states, and the quality of the application program can be enhanced.

Further, in the storage medium in which the application program developing program is stored, the first developing tool is a debugging device and the second developing tool is a simulation device, wherein the simulation device simulates the operation based on the application program by holding the input state while the debugging device debugs the application program.

According to the storage medium on which the application program developing program is stored, the input state to the simulation device can be held by operating the application program developing program on the computer.

Therefore, the number of items to be debugged in the application program is increased, and the simulation accuracy of the application program is enhanced.

BEST MODES FOR CARRYING OUT THE INVENTION

Figure 1:
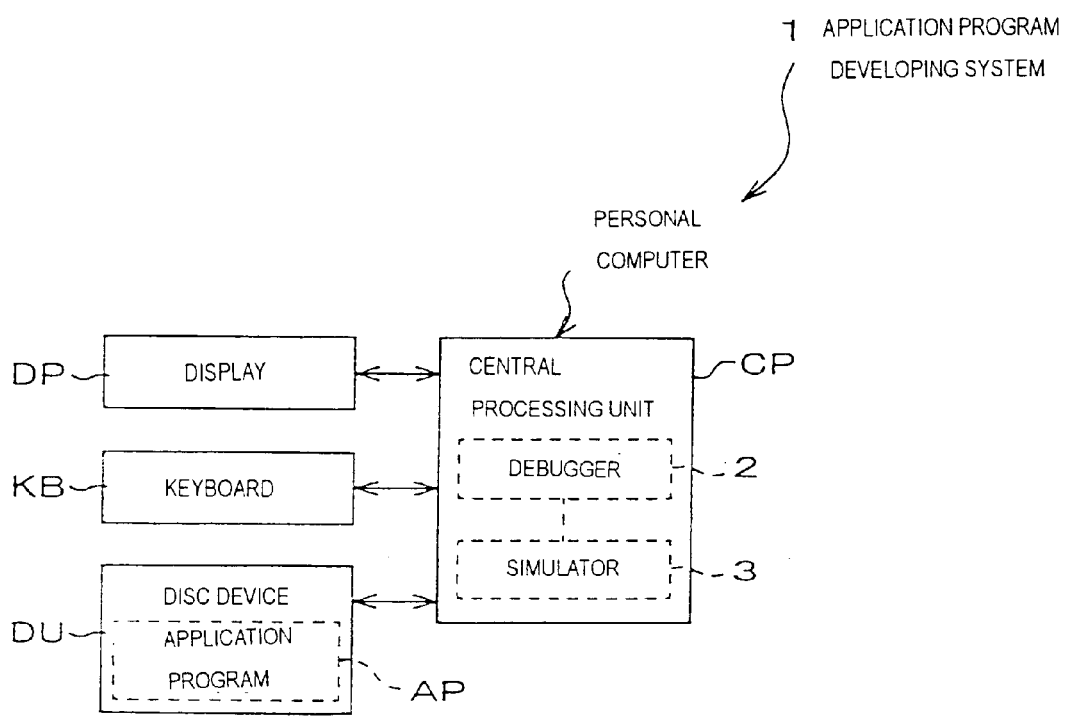
FIG. 1 is a diagram showing the overall construction of an application program developing system according to an embodiment.

Embodiments of an application program developing system and an application program developing method according to the present invention, and a storage medium in which the application program developing program is stored will be described below with reference to the drawings.

In the application program developing system and the application program developing method according to the present invention, a first developing tool can be activated while holding the input state of a second developing tool. Particularly when the first developing tool is a debugging device and the second developing tool is a simulation device, the simulation device can simulate the step-by-step operation of an application program while holding the input state when the debugging device executes the application program step by step, and so on. Further, the storage medium according to the present invention in which the application program developing program according to the present invention is stored can form the application program developing system according to the present invention when the application program developing program is loaded through the storage medium into a computer and executed therein. Further, development of the application program based on the application program developing method according to the present invention can be implemented.

Each developing tool is a tool formed on a computer which performs debugging, simulation, etc., on an application program operating on a target system, and for example, is a debugger or simulator. Since these developing tools are formed on one computer, they commonly use a display, a keyboard, a disc device, etc. connected to the computer. Further, the target system is a system operating on the basis of the application program, and for example it is a microcomputer or the like. Further, the storage medium is a medium in which an application program developing program can be stored and from which the application program developing program can be loaded into a computer. For example, it is a floppy disk, an optical disk, a hard disk or the like. The application program developing program may be a program formed by a plurality of programs which are formed for each developing tool, or it may be one program achieved by integrally forming all the developing tools. Accordingly, the storage medium in which the application program developing program is stored may be one storage medium in which all the application program developing programs are stored, or a plurality of storage media in which respective application program developing programs are stored for each developing tool.

In this embodiment, the first developing tool is a debugging device, and the second developing tool is a simulation device. Further, in this embodiment, the debugging device is formed as a debugger for loading a debugging program into a personal computer through a storage medium in which the debugging program is stored and making the personal computer execute operations based on the debugging program to perform debugging. Further, in this embodiment, the simulation device is constructed as a simulator for loading a simulation program into the personal computer through a storage medium in which the simulation program is stored, and making the personal computer execute operations based on the simulation program to perform simulation. In this embodiment, the application program developing system (hereinafter referred to as a developing system) is formed by the debugger and the simulator, and the application developing program is formed by the debugging program and the simulation program. Further, in this embodiment, the simulator is connected to the debugger to form the developing system that can perform debugging while simulating the operation based on the application program. The debugger and the simulator are formed in the same personal computer. The OS of the personal computer is designed to provide a multi-window environment as a user interface. Further, in this embodiment, the developing system is set so that a microcomputer is used as a target system and the application program of the microcomputer is developed by using the debugger and the simulator. Still further, in this embodiment, the microcomputer is assumed to be installed in an installed target device which allows an external key input and LCD output used in, for example, a game, a clock, a data bank or the like.

First, the overall construction of a developing system 1 will be described with reference to FIG. 1.

The developing system 1 is designed as a system for developing an application program AP for a microcomputer, and is provided with a debugger 2 and a simulator 3. In the developing system 1, the operation based on the application program AP is debugged by the debugger 2 while being simulated by the simulator 3.

With respect to the debugger 2, a disc device DU of a personal computer PC reads out a debugging program from a storage medium in which the debugging program is stored. Thereafter, the debugging program is loaded into RAM (Random Access Memory) (not shown) and executed by a central processing unit CP to perform debugging. The disc device DU is a device which can perform reading/writing in accordance with a storage medium such as a floppy disk, an optical disk or the like. The debugger 2 reads out the application program AP of the microcomputer from the disc device DU, and debugs the application program AP. The debugger 2 can be operated by using a keyboard KB when the window of the debugger is active, and a debug display frame can be viewed on a display DP.

The debugger 2 can perform an execution, a break, a trace, etc., on the application program AP step by step. Further, the debugger 2 is connected to the simulator 3 to start/stop the simulator 3, refer to/rewrite data on the simulator 3, etc. Still further, the debugger 2 can accept key inputs to the simulator 3 in order to hold the input state to the simulator 3 when it is activate.

With respect to the simulator 3, a disc device DU of a personal computer PC reads out a simulation program from a storage medium in which the simulation program is stored. Thereafter, the simulation program is loaded into RAM (not shown) and executed by the central processing unit CP to perform simulation. The simulator 3 reads out the application program AP of the microcomputer from the disc device DU, and simulates the operation based on the application program AP. Further, the simulator 3 can be generally operated by using the keyboard KB in connection with the key input of the installed target device when the window of the simulator 3 is active, and outputs an LCD display frame on the display DP in accordance with the screen output of the LCD of the installed target device. For the simulator 3, each key of the keyboard KB is allocated in connection with each key of the installed target device of the microcomputer.

Since the simulator 3 is connected to the debugger 2, it simulates the operation based on the application program AP in accordance with the debugging operation. Further, the simulator 3 can simulate the application program AP in accordance with the debugging operation of the debugger 2 while holding the input state to the simulator 3 accepted by the debugger 2 even when the window of the simulator is not active.

The keyboard KB is commonly used with the debugger 2 and the simulator 3. Therefore, the input from the keyboard KB is set as the input to the debugger 2 when the window of the debugger 2 is active, and as the input to the simulator 3 when the window of the simulator 3 is active.

The display DP is commonly used with the debugger 2 and the simulator 3. Therefore, when the two developing tools, namely, the debugger 2 and the simulator 3, are used in parallel, necessary windows are opened on the display DP. For example, a trace window WD1, a command window WD2, and a dump window WD3 of the debugger 2 as well as an LCD window WS of the simulator 3 are displayed on the display DP, as shown in FIG. 3(b).

Figure 2:
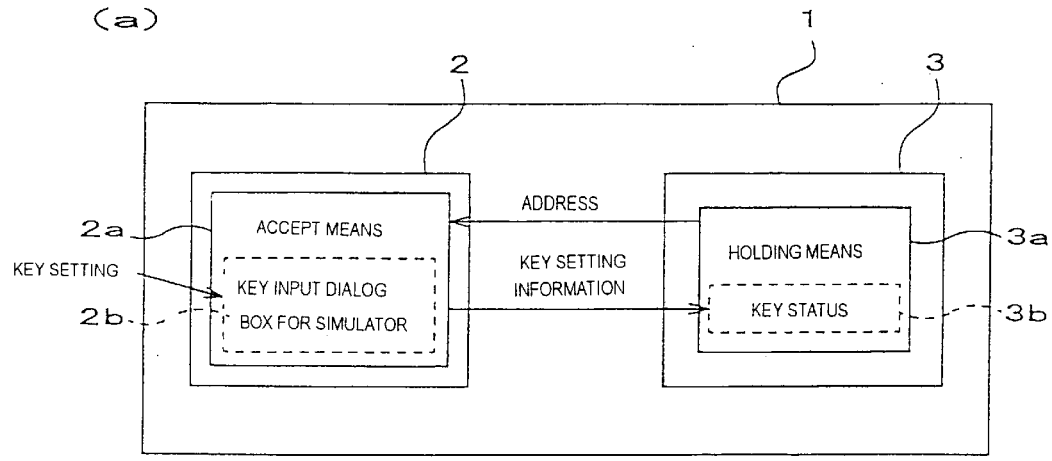
FIG. 2 shows a debugger and a simulator according to the embodiment, wherein (a) is a diagram showing the internal construction, (b) shows an example of a key status, and (c) shows an example of a key input dialog box for the simulator.
Figure 2:
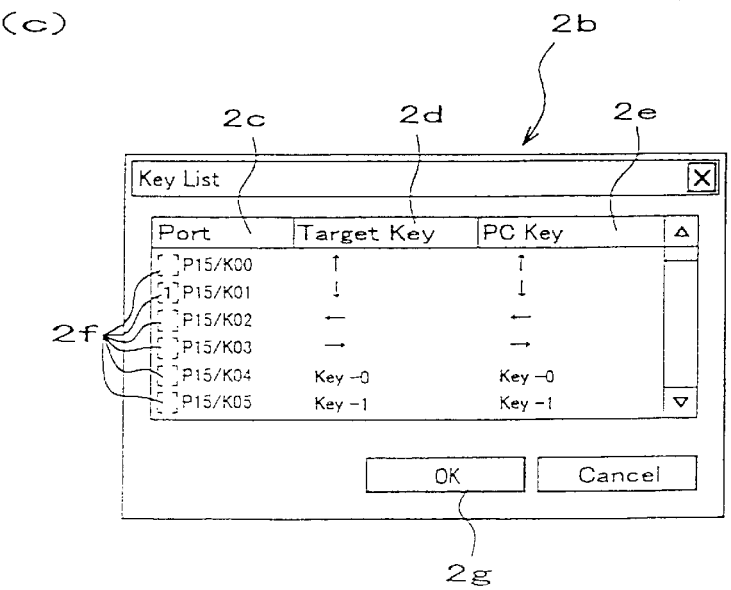

Next, the internal construction of the debugger 2 and the simulator 3 to hold the key input state of the simulator 3 during the debugging operation of the debugger 2 will be described with reference to FIG. 2. The debugger 2 is equipped with accepting means 2a, and the simulator 3 is equipped with holding means 3a. Further, the holding means 3a is equipped with a key status 3b for setting the key input state from the debugger 2 to the simulator 3.

In this embodiment, the accepting means 2a corresponds to the accepting means described in the Claims, and the holding means 3a corresponds to the holding means described in the Claims.

The key status 3b is an arrangement indicating whether each key of the keyboard KB used for the simulator 3 (that is, each key of the installed target device) is pressed or not, and it is stored in RAM (not shown) or the like of the personal computer PC. Each key for the input to the simulator 3 is allocated to the keyboard KB in connection with each key of the microcomputer-installed target device. As shown in FIG. 2(b), in the key status 3b, [1] is set for each key when the key is pressed, and [0] is set for each key when the key is not pressed. The initial value is set to [0]. In the example of FIG. 2(b), [1] is set to the [↓] key, and [0] is set to the other keys. Therefore, the input to the simulator 3 shows that the [↓] key is in a pressed state and the other keys are in a non-pressed state.

The accepting means 2a accepts the key setting corresponding to the key input state which is required to be held in the simulator 3, and writes this key setting information into the key status 3b. Therefore, for the interface with the user, the accepting means 2a is equipped with a key input dialog box 2b for the simulator which has a list of keys used in the simulator 3 and a setting column for each key (that is, the display frame corresponding to the key status 3b). An example of the key input dialog box 2b for the simulator is shown in FIG. 2(c). The key input dialog box 2b for the simulator has a setting column 2c for each key, a key list 2d of the installed target device and a key list (that is, a key list set to the keyboard KB) 2e of the simulator 3. When there is a key which the user wants to hold, the user sets a check column 2f, . . . of the setting column 2c corresponding to the key of the key list 2e of the simulator 3 to [1]. In (c) in the figure, [1] is set to the [↓] key in order to hold the state that the [↓] key is pressed. The user clicks an OK button 2g to determine the key which the user wants to hold. Note that the key input dialog box 2b for the simulator can be opened/closed by the tool button of the debugger 2. When the key input dialog box 2b for the simulator is opened by the operation of the user, the accepting means 2a receives the memory address of the key status 3b transmitted from the simulator 3. The key input set in the key input dialog box 2b for the simulator by the user is written as [0] or [1] into the state of each key of the key status 3b allocated to the memory address by the accepting means 2a.

As described above, the holding means 3a is equipped with the key status 3b, and holds the key input state set in the key status 3b. Therefore, the holding means 3a transmits the memory address of the key status 3b, etc. to the accepting means 2a when the key input dialog box 2b for the simulator is opened in the debugger 2. When the number of keys to be set is fixed, the memory address, etc. may comprise the head memory address of the key status 3b. Alternatively, when the number of keys to be set is not fixed, the memory address, etc. may comprise the memory address corresponding to each key, the head memory address of the key status 3b and the number of keys, or the head memory address and the end memory address of the key status 3b. When the key status 3b is rewritten by the accepting means 2a, the holding means 3a holds this key input state until the key status 3b is rewritten again. The holding of the key input state means that the press state of keys for which [1] is set on the key status 3b are pressed is held even when the window of the simulator 3 is non-active. The key input state may be held according to the setting of the key status 3b or the key input to the keyboard KB by the user may be given priority while the window of the simulator 3 is active. It is noted that when all the keys of the key status 3b are set to [0], the holding means 3a holds the state none of the keys are pressed.

Therefore, the simulator 3 can simulate the operation based on the application program AP while the key input state set in the key status 3b is held by the holding means even when the window of the simulator 3 is not active. Accordingly, the simulator 3 can simulate the operation based on the application program AP in connection with the debugging operation while holding the key input state even when the debugger 2 is carrying out the debugging operation (for example, step-by-step execution or the like) of the application program AP.

According to the developing system 1, even when the window of the simulator 3 is not active, the key input from the debugger 2 to the simulator 3 can be accepted by the accepting means 2a. Further, in the developing system 1, the key input state of the simulator 3 can be held by the holding means 3a even when the debugging operation is in progress in the debugger 2 (that is, while the window of the debugger 2 is active).

Figure 3:
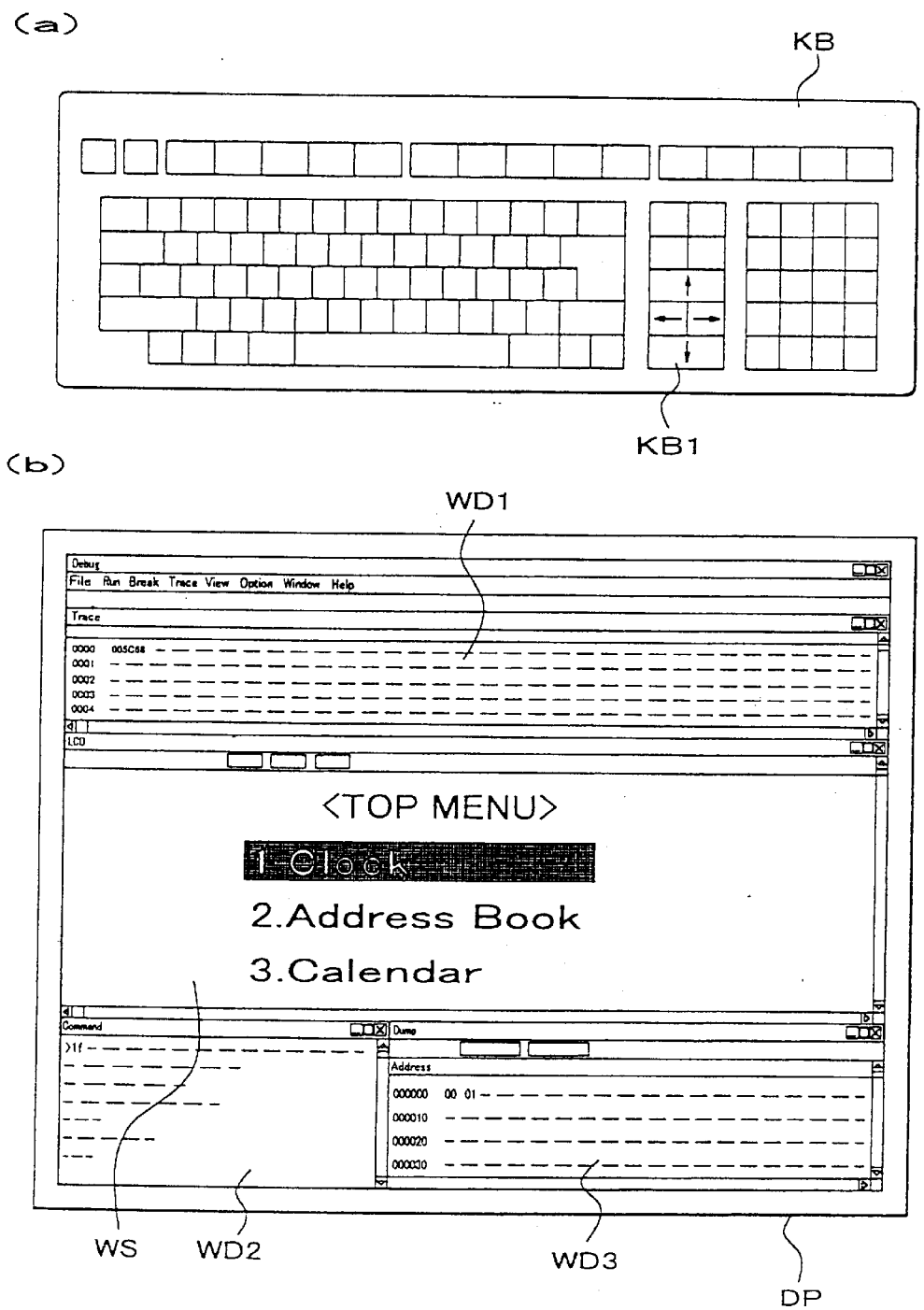
FIG. 3 shows common means of the debugger and the simulator according to the embodiment, wherein (a) is a keyboard connected to a personal computer, and (b) shows a display connected to the personal computer showing an example of the window of the debugger and the simulator.
Figure 4:
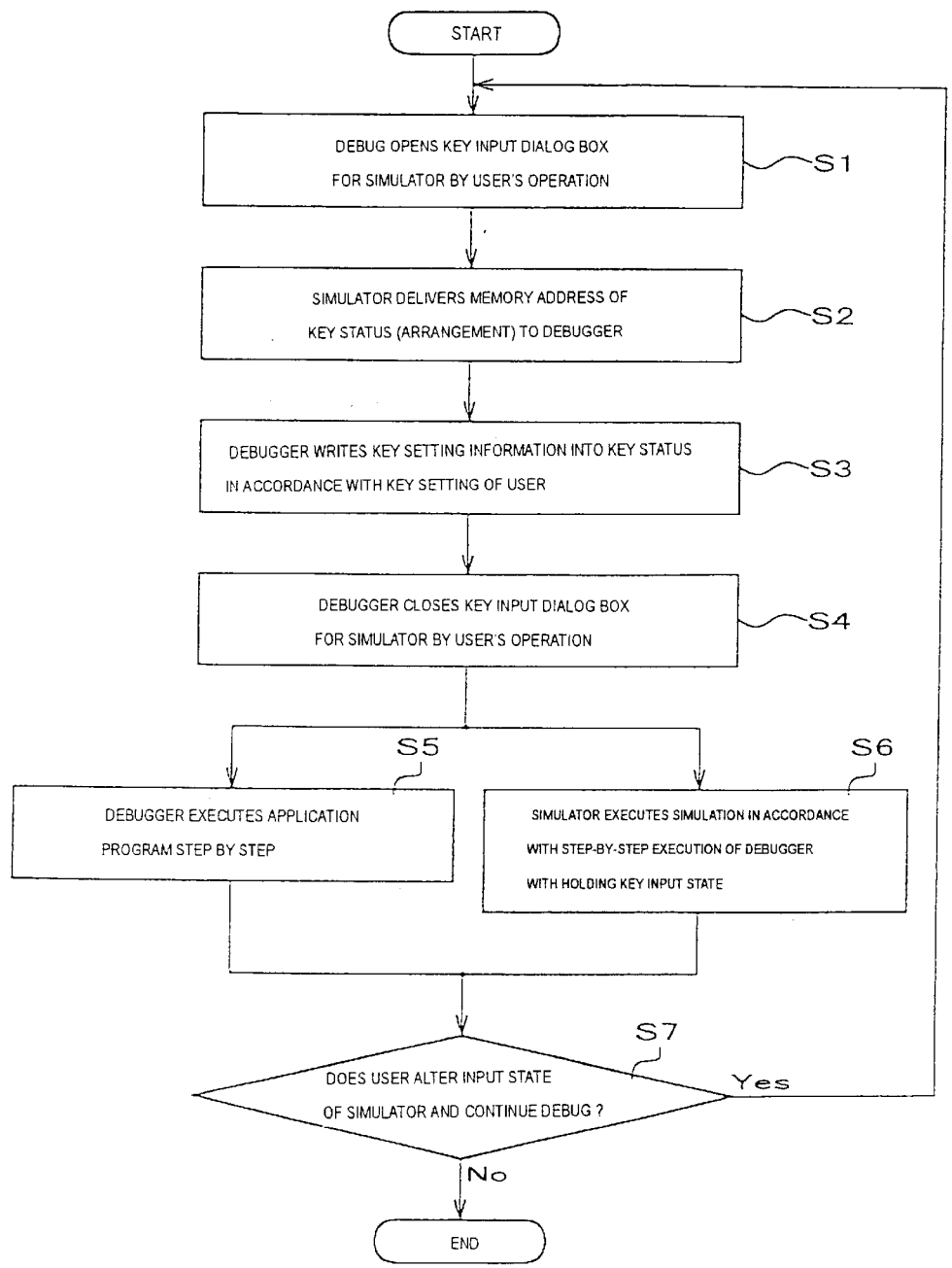
FIG. 4 is a control flowchart of an application program developing method according to the embodiment.

Next, the application program developing method of the developing system will be described with the flowchart in FIG. 4. The developing method described hereunder is a method for carrying out the debugging by the debugger while holding the key input state to the simulator 3. Further, in order to clarify the description, there is assumed a case in which in the developing system 1, the application program AP is executed step by step in the debugger 2 while the state that the [↓] key is continually pressed is held in the simulator 3 in order to move the inverted display of <TOP MENU> of the LCD window WS from the column [1.Clock] (see FIG. 3(b)) downward. FIGS. 1 to 3 will be referred to in connection with the description.

When the inverted display <TOP MENU> of the LCD window WS of the simulator 3 is moved from the column [1.Clock] downward, a direct input to the simulator 3 (that is, an input by pressing the [↓] key KB1 of the keyboard KB (see FIG. 3(a))) cannot be performed when the step-by-step execution is being performed in the debugger 2. That is, when step-by-step execution is carried out in the debugger 2, the window of the debugger 2 is active, and thus the LCD window WS of the simulator 3 is not made active. Therefore, when the tool button for opening/closing the key input dialog box 2b for the simulator of the debugger 2 is operated by the user, the debugger 2 opens the key input dialog box 2b for the simulator on the display DP (S1).

At this time, the simulator 3 delivers the memory address of the key status 3b to the debugger 2 (S2). The debugger 2 receives the memory address, and recognizes the writing area in the key status 3b.

Further, when the key input dialog box 2b for the simulator is opened, the user sets the key input state desired to be held in the simulator 3 into the setting column 2c of the key input dialog box 2b for the simulator. That is, the user inputs [1] in the check column 2f of the [↓] key which the user wants to hold, and sets the non-input state in the check columns 2f of the other keys. After inputting, the debugger 2 writes the key setting information from the user into the key status 3b in accordance with the key setting (S3).

In this embodiment, the processing of step S1 and step S3 corresponds to the accepting step described in the Claims.

When the tool button for opening/closing the key input dialog box 2b for the simulator of the debugger 2 is operated by the user after the key setting, the debugger 2 closes the key input dialog box 2b for the simulator (S4). The simulator 3 holds the state where the [↓] key is pressed until the user next alters the key setting in the key input dialog box 2b for the simulator. Note that the key input dialog box 2b for the simulator may be kept open on the display DP.

After the key input state is held in the simulator 3, the debugger 2 executes the application program AP step by step by the user's operation (S5). At this time, any window of the debugger 2 is active on the display DP.

At this time, the simulator 3 holds the state where the [↓] key is pressed, and simulates the operation based on the application program AP step by step in connection with the step-by-step execution of the debugger 2 (S6). That is, the simulator 3 executes the application program AP step by step under the condition that the [↓] key is pressed to perform the simulation. At this time, the window of the simulator 3 is not active on the display DP. The debugger 2 displays the data of the ROM and RAM of the simulator 3 on the dump window WD3, etc. in accordance with the user's operation. Further, the simulator 3 displays the simulation result based on the step-by-step execution on the LCD window WS. The user controls which window is displayed on the display DP.

The user watches or rewrites the data on the window thus displayed to perform the debugging.

In this embodiment, the processing of step S6 corresponds to the holding step described in the Claims.

Further, the user alters the key input state of the simulator 3 to carry out the operation as to whether the debugging is continued or not (S7). When the debugging is continued, the processing returns to step S1, and when the debugging is finished, the processing is finished.

According to the application program developing method, the key input from the debugger 2 to the simulator 3 can be accepted in the accepting step even when the window of the simulator 3 is not made active. Further, the application program developing method can hold the key input state of the simulator 3 in the holding step even when the debugging is in progress in the debugger 2 (that is, the window of the simulator 3 is not active).

The present invention is not limited to the above embodiment, and it may be embodied in various modes.

For example, the key setting information is delivered from the debugger to the simulator by writing the key setting input from the debugger into the key status of the simulator. However, no limitation is imposed on the means of delivering the key setting information from the debugger to the simulator, and, the type of the key for holding the pressed state may be delivered from the debugger to the simulator, for example.

Further, the application developing program itself may be constructed so as to be downloaded from another computer through a network and executed irrespective of the storage medium.

The above-described application program developing system according to the present invention can hold the input state in the second developing tool even when the first developing tool is active. Therefore, the number of estimation items in the application program developing stage can be increased, and the quality of the application program is enhanced.

The application program developing system of the present invention can hold the input state of the simulation device even when the debugging device carries out the debugging. Therefore, the number of the items to be debugged in the application program is increased, and the estimation precision of the application program is enhanced.

The application program developing method according to the present invention makes it possible to hold the input state in the second developing tool even when the first developing tool is active. Therefore, the number of estimation items in the developing stage of the application program can be increased, and the quality of the application program is enhanced.

The application program developing method according to the present invention makes it possible to hold the input state of the simulation device even when the debugging is in progress in the debugging device. Therefore, the number of items to be debugged in the application program is increased and the estimation precision of the application program is enhanced.

With the storage medium in which the application program developing program according to the present invention is stored, by operating the application program developing program on the computer, the input state can be held in the second developing tool even when the first developing tool is active. Therefore, the number of estimation items in the application program developing stage can be increased, and the quality of the application program can be enhanced.

With the storage medium in which the application program developing program according to the present invention is stored, by operating the application program developing program on the computer, the input state of the simulation device can be held even when the debugging is in progress in the debugging device. Therefore, the number of items to be debugged in the application program is increased and the simulation accuracy of the application program is enhanced. The entire disclosure of Japanese Patent Application 2000-178343 is incorporated herein by reference.

What is claimed is:

1. An application program developing system such that the system has a plurality of developing tools including at least first and second developing tools which are installed in a computer, the developing tools commonly use input means of the computer as input means for these developing tools, the developing system develops application programs that work on a target system, comprising:

accepting means in said first developing tools, for accepting an input to the second developing tool; and holding means in said second developing tool, for holding an input state accepted by said accepting means while said first developing tool is active.

2. The application program developing system as claimed in claim 1, wherein said first developing tool is a debugging device, said second developing tool is a simulation device, and said simulation device simulates an operation based on the application program by holding the input state while said debugging device debugs the application program.

3. An application program developing method of a program that has a plurality of developing tools including at least first and second developing tools which are installed in a computer, the developing tools commonly use input means of the computer as input means for these developing tools, the developing system develops application programs that work on a target system, comprising:

an accepting step in which said first developing tool accepts an input to the second developing tool; and a holding step in which said second developing tool holds an input state accepted in said accepting step while said first developing tool is active.

4. The application program developing method as claimed in claim 3, wherein said first developing tool is a debugging device, said second developing tool is a simulation device, and said simulation device simulates an operation based on the application program by holding the input state while said debugging device debugs the application program.

5. A storage medium with an application program developing program such that the program has a plurality of developing tools including at least first and second developing tools which are installed in a computer, the developing tools commonly use input means of the computer as input means for these developing tools, the developing system develops application programs that work on a target system characterized in that:

in said application program developing program, said first developing tool accepts an input to said second developing tool; and said second developing tool holds the input state accepted by said first developing tool while said first developing tool is active.

6. The storage medium storing the application program developing program as claimed in claim 5, wherein said first developing tool is a debugging device, and said second developing tool is a simulation device; and said simulation device simulates an operation based on the application program by holding the input state while said debugging device debugs the application program.

* * * * *